United States Patent [19]
Voorhees et al.

[11] Patent Number: 5,862,512
[45] Date of Patent: Jan. 19, 1999

[54] METHOD AND APPARATUS FOR PROCESSING GEOCHEMICAL SURVEY DATA

[75] Inventors: Kent J. Voorhees, Golden, Colo.; James C. Hickey, Sandwich, Mass.

[73] Assignee: Colorado School of Mines, Golden, Colo.

[21] Appl. No.: 757,399

[22] Filed: Nov. 27, 1996

[51] Int. Cl.$^6$ .................................................. G06F 19/00
[52] U.S. Cl. ........................................................... 702/2
[58] Field of Search .................................. 702/2, 6, 9, 22, 702/23; 73/23.36, 23.37, 23.38, 152.04; 436/29, 30, 31

[56] References Cited

U.S. PATENT DOCUMENTS

| | | | |
|---|---|---|---|
| 4,008,388 | 2/1977 | McLafferty et al. | 235/151.35 |
| 4,573,354 | 3/1986 | Voorhees et al. | 73/432 R |
| 5,119,315 | 6/1992 | Kemp et al. | 364/498 |
| 5,128,882 | 7/1992 | Cooper et al. | 364/550 |
| 5,235,863 | 8/1993 | Bailey et al. | 73/863.23 |
| 5,286,651 | 2/1994 | Smith | 436/32 |
| 5,311,444 | 5/1994 | Ohta | 364/497 |
| 5,311,445 | 5/1994 | White | 364/498 |
| 5,328,849 | 7/1994 | Smith | 436/32 |
| 5,561,065 | 10/1996 | Schabron | 436/31 |
| 5,668,373 | 9/1997 | Robbat, Jr. et al. | 702/23 |
| 5,687,093 | 11/1997 | Long et al. | 702/2 |

OTHER PUBLICATIONS

Rivard, Benoit et al., "A Field–Portable Thermal Infrared Grating Spectrometer (THIRSPEC)", IEEE Transactions on Geoscience and Remote Sensing, vol. 32, No. 2, Mar. 1994, pp. 307–314.

*Primary Examiner*—Donald E. McElheny, Jr.
*Attorney, Agent, or Firm*—Holme Roberts & Owen

[57] ABSTRACT

Provided is a method for processing measured property data, such as property data that would be generated from measurement of a property of soil gas samples collected in a geochemical survey. Property data for individual components is processed to identify whether one or more of the components corresponds to a known contaminant material. When a portion of the property data is identified as corresponding to a contaminant material, then that portion of the property data is eliminated, and remaining property data is combined to form a composite for analysis purposes. Results of the analysis may be used to determine the location for drilling exploration or test wells to test for the presence of a targeted subterranean accumulation, such as of petroleum, natural gas, coal or an environmental pollutant.

24 Claims, 4 Drawing Sheets

METHOD AND APPARATUS FOR PROCESSING GEOCHEMICAL SURVEY DATA

FIELD OF THE INVENTION

The present invention involves processing of measured property data for components of a mixture for analytical purposes, and especially for use in geochemical surveys.

BACKGROUND OF THE INVENTION

Geochemical prospecting for subterranean accumulations of petroleum or natural gas based on analysis of collected soil gas samples is well known. Results of soil gas analysis provide information useful for evaluating the potential that a subterranean geologic structure may contain an accumulation of petroleum, natural gas or another targeted material. This information is helpful in selecting specific locations for further exploration evaluation, such as the drilling of exploration wells.

Various methods have been described for collecting and analyzing soil gas samples. One method for collecting and analyzing soil gas samples is described in U.S. Pat. No. 4,573,354. According to that method, soil gas samples are collected by adsorption of volatile soil gas compounds onto a carbon-coated ferromagnetic wire placed in holes in the ground. The adsorbed volatile compounds are then desorbed from each wire by heating the wire, using the Curie-point phenomenon. The desorbed compounds are swept into a mass spectrometer and a mass spectrum (referred to as a fingerprint) of the soil gas sample is obtained. A typical mass spectrum fingerprint of a soil gas sample collected above a petroleum reservoir is shown in FIG. 1.

The fingerprint provides some information concerning components of the soil gas sample. For example, mass peaks at m/z of 43, 57, 71, 85, and 99 have been shown to be associated with aliphatic hydrocarbons, while peaks at m/z of 91 and 105 have been shown to be associated with alkyl aromatic hydrocarbons. Also, a reference fingerprint obtained from an area over a known petroleum or gas reservoir may be compared with fingerprints of soil gas samples obtained from other geologically similar areas to identify exploration locations with a high potential for the presence of petroleum or natural gas. A preferred method of comparison according to the method of U.S. Pat. No. 4,573,354 is a multivariate statistical analysis, although other comparison techniques may also be used.

One problem that has been discovered with the method disclosed in U.S. Pat. No. 4,573,354 is that there is often one or more contaminant component(s) in the soil gas samples that may distort the mass spectrum, thereby impairing the accuracy with which the mass spectrum can be analyzed and, accordingly, the reliability of the analytical results as an indicator for the presence of the targeted material. In this regard, a contaminant component may be a naturally-occurring or human-introduced compound that is not associated with or indicative of underlying geologic features. For example, terpenes are naturally-occurring compounds that come from vegetation. The presence of terpenes in a soil gas sample can significantly interfere with accurate analysis of the soil gas mass spectrum. An example of a human-introduced contaminant is trichloroethane, which is widely found in aquifers due to its extensive use as a cleaning solvent. The presence of trichloroethane in a soil gas sample can significantly impair the accuracy of analysis. There is a significant need for a method to reduce the detrimental interference that may be caused by the presence of these and other contaminants.

SUMMARY OF THE INVENTION

It has been found that the accuracy and reliability of geochemical analysis of a multicomponent soil gas sample may be significantly improved when the soil gas sample is separated into separate portions, with each portion being a separately subjected to mass spectrometer measurement (rather than mass spectrometer measurement of the soil gas sample as a whole). The separation is typically accomplished by processing the soil gas sample through a chromatograph. The separated portions exiting the chromatograph are each individually fed to the mass spectrometer. In this manner, output from the mass spectrometer is a data set including a separate mass spectrum for each of the separated portions. Thus, there is a plurality of spectrums, or spectra, one for each separate portion. The portions are typically and preferably relatively pure in a single component, or compound, from the soil gas sample. The spectrums for the separate portions are, therefore, referred to herein for convenience as simply component spectrums. It should be recognized, however, that the portions need not each be substantially of a single component. One or more of the portions may be a mixture of two or more components.

According to the present invention, the component mass spectrums are processed, such as in an electric computer, in a manner to significantly reduce interference from contaminant materials during analysis of data from the mass spectrometer. Each component mass spectrum is electronically compared with one or more contaminant reference spectrum (s) of known contaminant material(s) stored in an electronic library. During the comparison, a determination is made as to whether a component spectrum matches with a contaminant reference spectrum of a known contaminant material, indicating that the contaminant material is present in the soil gas sample. In this regard, a contaminant material is any material, the influence of which would be desirable to remove from the analysis of the mass spectral data.

After checking for a match between the component spectrums and contaminant reference spectrum(s) for contaminant material(s), any component spectrum determined to correspond to a contaminant material is electronically removed from the data set. Remaining component spectrums are then electronically combined into a composite fingerprint (composite fingerprint) by summing of the individual component spectrums. Thus, a composite fingerprint having a spectrum pattern similar to that shown in FIG. 1 would be obtained in the case of a soil gas sample obtained over a petroleum reservoir.

Because any component spectrums identified as corresponding with known contaminant material(s) are not included in the preparation of the composite fingerprint, the effect of the contaminant material(s) is substantially eliminated from the spectrum pattern of the composite fingerprint, thereby permitting analysis of the composite fingerprint without the interference otherwise caused by background peaks contributed by the contaminant material (s).

After construction of the composite fingerprint, which is substantially free of interference from the contaminant material(s), then the composite fingerprint may be processed in any known way to compare that composite fingerprint with a reference fingerprint. This comparison may, for example, be conducted using a multivariate statistical approach such as that disclosed in U.S. Pat. No. 4,573,354. Another method is to use a neural network. Yet another method is to simply compare ratios of the peaks of certain components. It is preferred that the reference fingerprint, with which the composite fingerprint is compared, has been prepared in a manner similar to that described herein for the composite fingerprint, to remove features attributable to the known contaminant material(s).

The present invention, therefore, permits comparison of multicomponent spectral patterns without significant interference from contaminant(s) present in the soil gas. Output from the analysis, therefore, provides a more accurate and more reliable indication as to whether a geologic structure underlying the location where a soil gas sample was collected contains a targeted accumulation. The targeted accumulation may be a carbonaceous mineral such as petroleum, natural gas or coal; a non-carbonaceous mineral such as a gold-bearing or other metal-bearing mineral; or a geothermal accumulation. The present invention is also useful for identifying the possibility that one or more pollutants may be present in a subterranean location. The targeted pollutant could be an organic or inorganic material. For example, if there is known contamination of an aquifer by a pollutant, then a survey may be made of soil gas samples collected in the area of suspected pollution in an effort to determine the areal extent of the pollution problem. Information obtained from such a survey is helpful in determining the extent of the pollution problem and possible remediation measures that could be taken to alleviate the pollution problem. Those locations showing a higher likelihood of having the targeted subterranean accumulation, whether for mineral prospecting or pollution identification purposes, can then be selected for further evaluation, such as for the drilling of an exploration well or a test well.

Although the present invention was developed primarily for analysis of soil gas samples for geochemical survey purposes, application of the present invention is not so limited. Any mixture, but typically a fluid mixture, could be processed similarly to prepare a composite fingerprint for comparison with a reference fingerprint. Also, the present invention is described herein with respect to mass spectral data for each separate portion of the fluid mixture. It should be recognized, however, that other properties besides component mass could be used instead. For example, following chromatographic separation, the separate portions could each be subjected to infrared spectroscopy and an infrared absorption spectrum generated for each portion. The absorption spectrums of the separate portions could then be processed in the same manner as described herein for processing of mass spectrums to remove those portions of the data that are representative of contaminant material(s), prior to construction of a composite spectrum for comparison with reference data. Furthermore, although the composite fingerprint is discussed herein in terms of a composite spectrum constructed by combining individual component spectrums, it should be understood that the present invention is not so limited. In that regard, the composite fingerprint could be any combined data representation that excludes contributions from identified contaminants and that has some correlatable feature or features that can serve as a fingerprint for comprising with a reference fingerprint of like constitution.

The electronic processing of information according to the present invention may be accomplished using any computing hardware having appropriate input, output, processing and memory capabilities. Such computing hardware may be programmed with software having the necessary processing steps or programmed by hard-wiring in a dedicated device. Such computing hardware programmed with the method of the present invention is within the scope of the present invention.

As noted, the present invention may be used with any multicomponent mixture of substances but is particularly well suited for use with fluid mixtures, and especially soil gas samples. As used herein, a soil gas sample is a multicomponent mixture of gaseous and/or vaporous and/or volatile components contained within, passing through, or emanating from the earth. In that regard, a soil gas sample includes those components that would be adsorbed by an adsorbent material, or otherwise collected, during a geochemical survey as well as components that could be removed from drill core samples or other earth samples, including soil samples, rock samples, water samples, etc.

DETAILED DESCRIPTION

The present invention provides a method and apparatus for processing measured property data for multicomponent mixtures to permit more accurate and reliable comparisons with reference data by eliminating from the property data portions of the data that are representative of undesirable contaminant component(s), when the contaminant component(s) are present in the fluid samples. The present invention provides for more reliable processing of geochemical survey data because possible interference from the contaminant(s) in the mixtures is reduced. Results of the geochemical survey, therefore, permit more reliable selection of drill sites to test for the presence of the desired subterranean accumulation. The geochemical survey may be for natural resource prospecting or for environmental monitoring.

Figure 2:
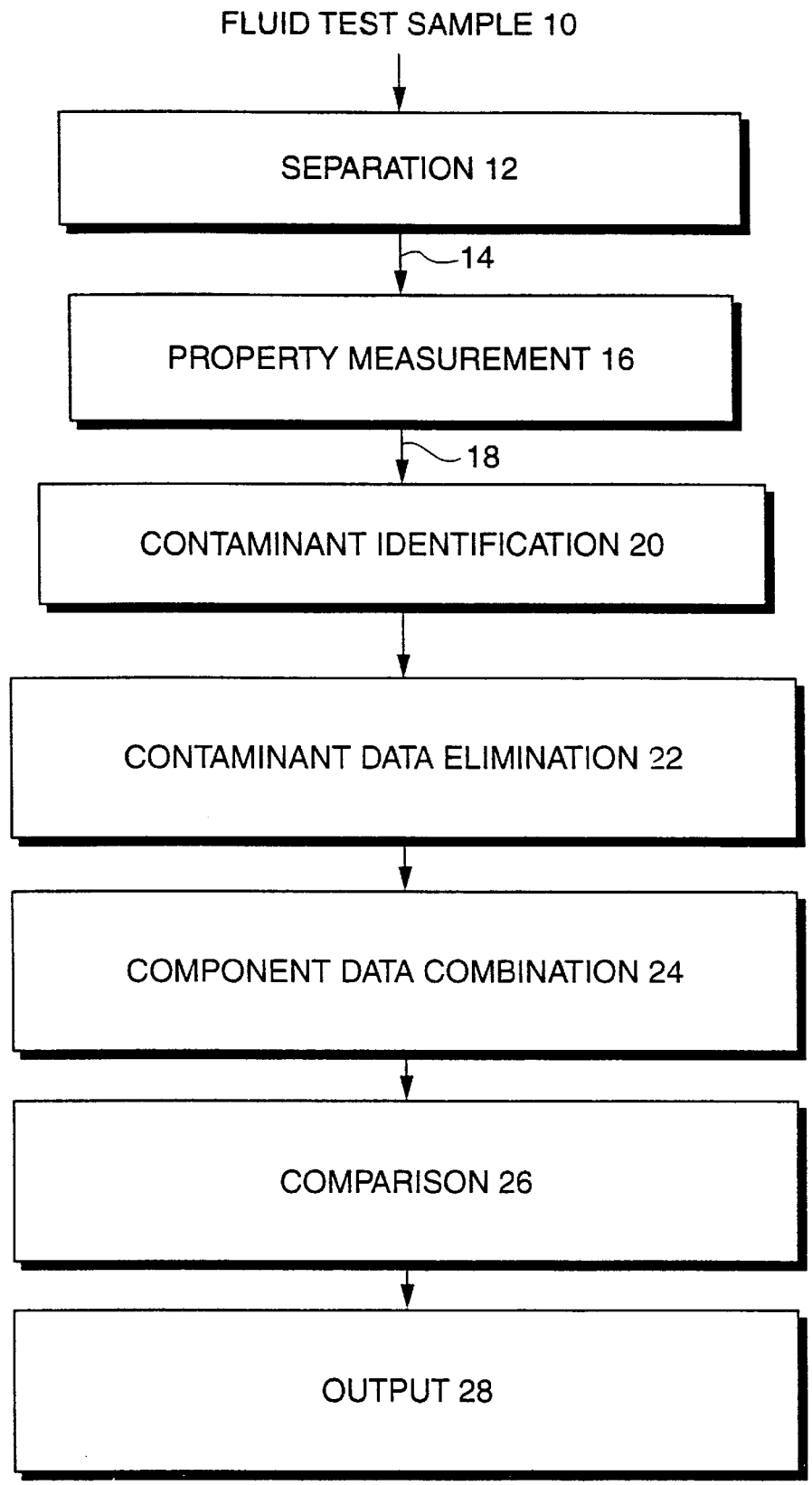
FIG. 2 is a block diagram of one process using the method of the present invention.

FIG. 2 shows a process block diagram for one application of the present invention. A sample 10, such as a soil gas sample, being a multicomponent mixture, is separated into separate portions in a separation step 12, usually by gas chromatography. The separate portions 14 are then sent to a property measurement step 16, where at least one property of each separate portion 16 is measured. Component property data 18, in electronic form, results from the property measurement step 16. The component property data 18 comprises a plurality of separate data portions, or data packets, typically with each data portion being an electronically represented spectrum of the measured property for one of the separate portions 16 of the sample 10.

The remaining steps shown in FIG. 2 involve electronic processing of the component property data 18, such as may be performed in an electronic computer. In a contaminant identification step 20, each data portion is separately evaluated to identify whether the data portion is representative of the presence of one or more undesirable contaminant(s).

Any data portion that is identified as corresponding to a contaminant is then eliminated from the component property data 18 in a contaminant data elimination step 22. All remaining data portions of the component property data 18 are then combined in a data combination step 24 to prepare a composite fingerprint. The composite fingerprint is then compared, in a comparison step 26, to reference data to determine the degree of similarity between the composite fingerprint and the reference data.

In geochemical surveys for natural resource prospecting or for environmental monitoring, the degree of similarity determined in the comparison step 26 between the reference data and composite fingerprint provides an indication as to whether there is a high or low probability that the targeted subterranean accumulation is present in the vicinity of the location where the sample 10 had been collected. Results of the comparison from the comparison step 26 are then typically outputted, in an output step 28, in a human cognizable form, such as in the form of a printout from a printer or a plotter or a video image on a video monitor.

The sample 10 may originate from any source, but is typically a soil gas sample collected in a geochemical survey. Mineral occurrences that may be the target of a geochemical survey include petroleum, natural gas, coal, metal-bearing minerals, and geothermal occurrences. Pollutants that may be the target of a geochemical survey for environmental monitoring include any pollutant materials, but are typically organic materials, which may be naturally occurring or human-introduced. Examples of such pollutants include gasoline, cleaning solvents and industrial waste products.

Although any suitable collection technique may be used, the sample 10 is preferably collected by means of an adsorbent material, which in one example is connected to a ferromagnetic wire support, such as is described in U.S. Pat. No. 4,573,354, the contents of which are incorporated by reference herein in their entirety. It should be recognized, however, that any adsorbent or absorbent sample collection material and support combination may be used to collect the sample 10 and that any desorption method may be used to remove the sample 10 from the sample collection material for processing of the sample 10 according to the present invention. Some examples of sample collection materials include charcoal, molecular sieve, activated carbon, activated alumina, diatomaceous earth, various polymer resins, silica gel, and others. In one embodiment, the adsorbent material is contained within a liquid-penetration resistant, vapor-permeable container when a soil gas sample is collected. One such container is made of porous flexible expanded polytetrafluoroethylene, such as is discussed in U.S. Pat. No. 5,235,863.

The separation step 12 may be accomplished using any technique for separating the sample 10 into the separate portions. For example, a soil gas sample collected on an absorbent support on a wire can be desorbed by heating. The desorbed gases may then be introduced into a gas chromatograph to separate the soil gas sample into a plurality of separate portions. Each separate portion may represent those components of the sample 10 that exit the chromatograph during a predetermined time interval. For example, any portion of sample 10 exiting the chromatograph during a one second interval is automatically fed to a mass spectrometer to generate a component spectrum for that portion. During some time intervals, no portion of the sample 10 may be exiting the chromatograph and, accordingly, no component spectrum will be generated for that time interval. For those time intervals during which a portion of the sample 10 exits the chromatograph, however, then the collected portion would be processed through the mass spectrometer to generate a component spectrum. Although it is possible that any given portion of the sample could be a mixture of individual components originally in the sample 10, if the time intervals of collection are properly selected with optimized chromatography, then each portion should substantially comprise only a single component from the sample 10. Also, it is possible that a single component could be exiting from the chromatograph over a time that spans multiple time intervals. In that event, there would be multiple separate portions that each comprise that component and, accordingly, multiple component spectrums would be obtained for that component.

In the property measurement step 16, any property useful for identifying a component may be measured. A preferred property for measurement is component mass, measured using a mass spectrometer. Output from the mass spectrometer is a plurality of mass spectrums, one for each component portion, with mass typically represented as a mass-to-charge ratio, m/z, where m is the mass in atomic mass units of the ionized component and z is the charge of the ionized component. Another possibility for the property measurement step 16 is to make a spectroscopic measurement of the components. For example, infrared absorbance could be measured and component absorbance spectrums could be obtained using Fourier transformation infrared spectroscopy.

As noted above, the component property data 18 typically comprises a plurality of component spectrums, with each component spectrum relating to the measured property of a different one of the separate portions of the sample 10. In the contaminant identification step 20, each component spectrum is electronically compared with one or more electronically stored contaminant reference spectrum(s) for known contaminant(s). A component spectrum is identified as being representative of a contaminant if the component spectrum and a contaminant reference spectrum are determined to match. Techniques for matching are well known in the art. Examples of possible contaminants include terpenes, chlorinated solvents such as trichloroethane and trichloroethylene, drilling muds, and refined hydrocarbon materials. The sensitivity of the determination as to whether there is a match between a component spectrum and a contaminant reference spectrum may be adjusted to any level of sensitivity desired for a particular application.

In the contaminant data elimination step 22, any component spectrum determined to match a contaminant reference spectrum is removed from the component property data 18, typically by use of a computer program. Portions of the component property data 18 that have been determined to be representative of the presence of a contaminant in the sample 10 are thereby removed so that data attributable to the contaminant will substantially not interfere with further processing of the component property data 18.

In the component data combination step 24, component spectrums remaining after the contaminant data elimination step 22 are combined to create a composite spectrum, which serves as the composite fingerprint. Typically, combining of the remaining component spectrums involves a simple summing of all of the remaining component spectrums into a single composite spectrum by an electronic computer. This composite spectrum will be substantially the same as a spectrum that would be generated by measurement of the property by direct measurement on an unseparated sample 10 not having any of the identified contaminant(s). Although a composite spectrum is preferred as the composite fingerprint, the use of a composite spectrum is not required, as noted previously. In that regard, any combination of data may be used that relates to the separated portions, or the components thereof, from which data representative of the identified contaminants has been removed, so long as the combination of data may be evaluated as a whole for comparison with a reference fingerprint of corresponding structure to identify patterns of similarity.

In the comparison step 26, the composite fingerprint generated in the data combination step 24 is compared with a reference fingerprint to determine the degree of similarity between the composite fingerprint and the reference fingerprint. The comparison may be performed by any known technique. Preferred techniques are to use a multi-variate statistical analysis or to use a neural network.

The reference fingerprint is typically a reference spectrum that has been generated from a reference survey of an area overlying a subterranean accumulation of the targeted type. For example, a representative mass spectrum of soil gas samples collected from an area overlying a known petroleum reservoir could be used as the reference fingerprint to compare with the composite fingerprints generated according to the present invention corresponding to soil gas samples collected in a petroleum exploration area of interest.

For a more accurate and reliable comparison in the comparison step 26, it is preferred that the reference fingerprint has been generated with the same regard for removing contaminant data as discussed herein with respect to the processing described in FIG. 2 to prepare the composite fingerprint. In that way, the reference fingerprint and the composite fingerprint will both be substantially free of interference that could be caused by known contaminants.

It should be recognized that it is not necessary that all of the steps shown in FIG. 2 be performed in a single operation or at a single site. For example, the fluid samples 10 may be collected at one site; the separation and measurement may be conducted at a second site; and the remaining information processing steps may be carried out at a third site.

The results from the comparison step 26 may be utilized to identify particular locations to consider for further exploration evaluation. For example, a site corresponding to a soil gas sample for which there is determined to be a close similarity between the composite fingerprint and the reference fingerprint could be selected for further evaluation. The further evaluation could include drilling of an exploratory well or otherwise excavating to a subterranean location at the site to test the subterranean location for the presence of the targeted mineral. A similar procedure could be followed to select the site for drilling a test well to monitor the spread of subterranean pollution.

The information processing steps of the present invention may be electronically performed using any computing equipment having an input interface for receiving the component property data in electronic form; an electronic processor to perform the contaminant identification, contaminant data elimination, component data combination and comparison functions described previously; memory for electronically storing contaminant data and the reference data; and an output interface for outputting results, in electronic form, of the comparison between the composite fingerprint and the reference data. The computing equipment may be dedicated or generally programmable with software. The hardware components useful for the computing equipment are all well known in the art.

Figure 1:
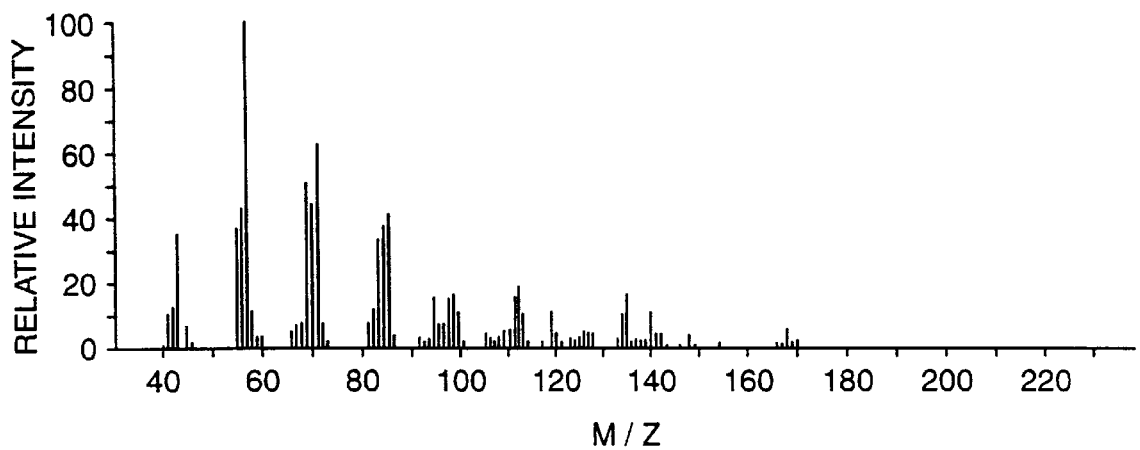
FIG. 1 is a typical mass spectrum of a soil gas sample obtained over a petroleum reservoir.
Figure 3:
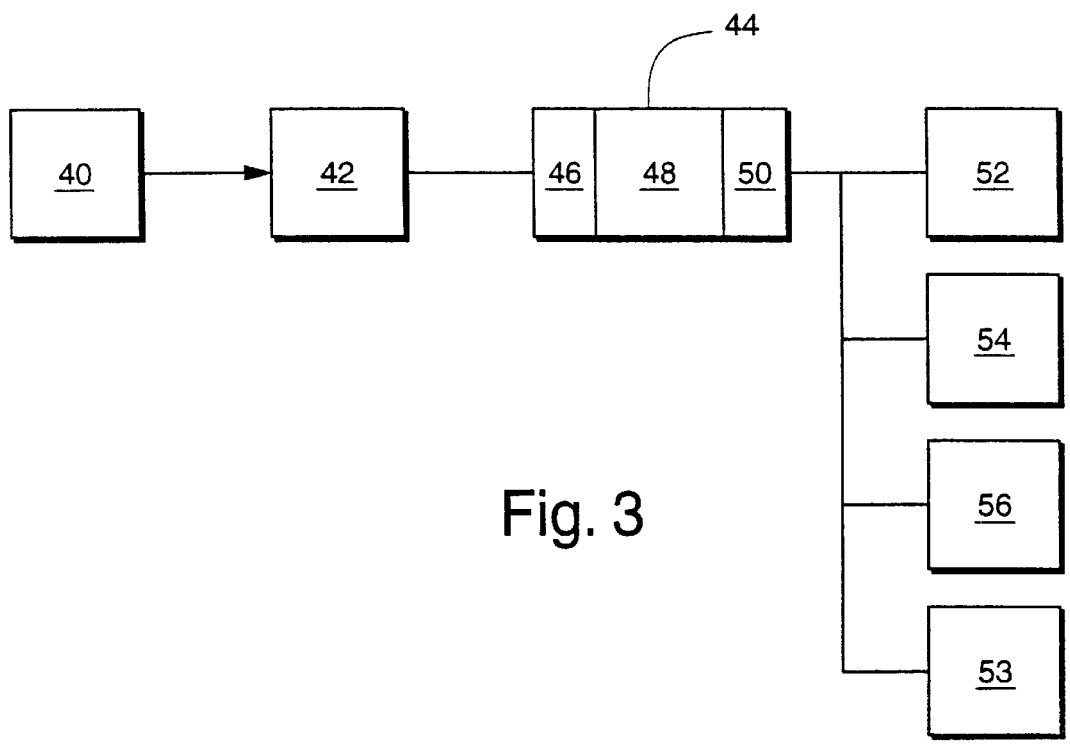
FIG. 3 is a block diagram showing one combination of equipment according to the present invention.

FIG. 3 shows one embodiment of an equipment setup for performing the analysis according to the present invention.

A gas chromatograph 40 is connected in fluid communication in series with a mass spectrometer 42, so that a sample introduced into the chromatograph 40 will be separated into separate portions, as previously discussed, prior to introduction of each separate portion into the mass spectrometer 42.

The mass spectrometer 42 is operatively electrically connected with an electronic computing device 44 for performing the information processing steps previously described. The computing device 44 has an electronic data input interface 46, an electronic data processing unit 48 and a data output interface 50. During operation, the data input interface 46 electronically receives component spectrums from the mass spectrometer 42, which are then electronically manipulated by the data processing unit 48 to perform the contaminant identification, contaminant data elimination, component data combination and comparison steps previously described with reference to FIG. 2. The data processing unit 48 comprises memory, such as RAM or DRAM memory, for storing information, such as the reference fingerprint, used during the data manipulation. The data processing unit also has a processor, typically one or more microprocessors, for performing the actual data manipulation. The output interface 50 electronically outputs from the computing device 44 results of data manipulation performed in the data processing unit 48.

The output interface 50 of the computing device 44 is operatively electrically connected with output display devices including a video monitor 52, a plotter 53 and a printer 54 where output from the output portion 44 can be visually presented in human cognizable form. The output interface 50 is also operatively electrically connected with a data storage device 56, such as a hard disk drive or an optical disk drive.

In one embodiment of the present invention, the relative concentrations may be determined for components of a mixture, such as a soil gas sample. Analysis of relative concentration data is useful to provide a further indication as to the potential presence or absence of the target mineral or pollution occurrence. In contrast, a mass spectrum obtained from desorption of the soil gas components directly into the mass spectrometer, as described in U.S. Pat. No. 4,573,354, is of the total fluid mixture, making individual component analysis difficult and generally inaccurate.

EXAMPLE

This Example demonstrates preparation of a composite fingerprint for a four-component mixture, with one of the components being an undesirable contaminant.

A mixture is provided containing four components: hexane (component A), dichloromethane (component B), benzene (component C), and toluene (component D). A composite fingerprint is prepared, as described below, for the mixture, excluding contributions from dichloromethane, which is considered to be an undesirable contaminant in this example.

Figure 4:
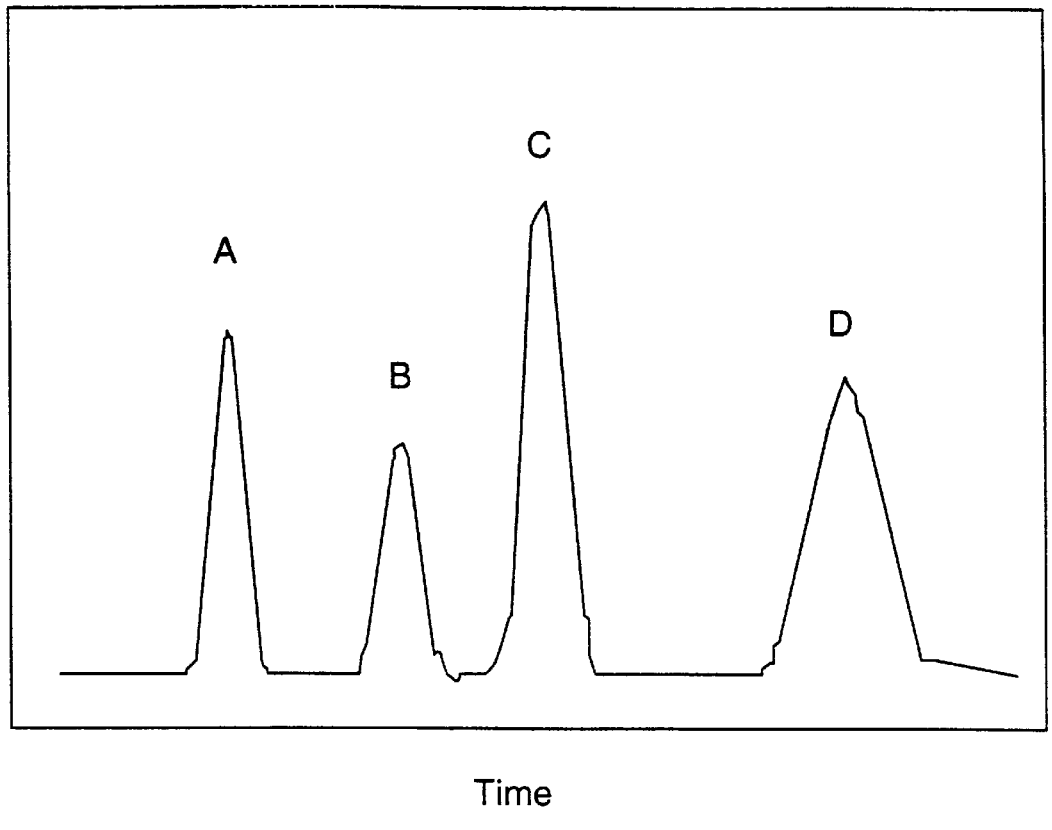
FIG. 4 is a chromatogram of a four-component mixture processed in the Example.
Figure 5:
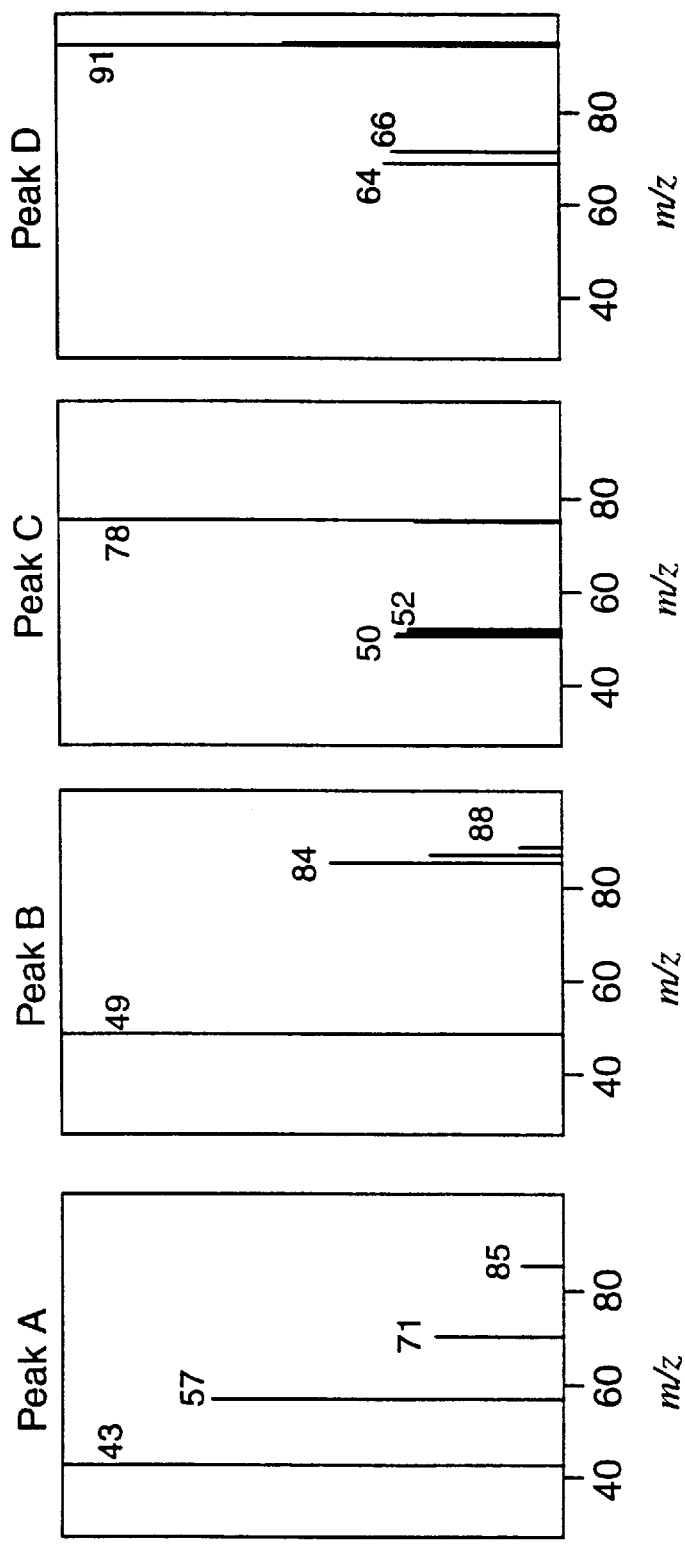
FIG. 5 graphically depicts four component spectrums of components of a mixture processed in the Example.

The mixture is fed to a gas chromatograph which separates the mixture into multiple separated portions, each portion being relatively pure in a single component. FIG. 4 graphically shows a chromatogram with the relative timing for each of the components to exit from the gas chromatograph. Each separated portion is introduced into a mass spectrometer and mass spectrums are obtained for each portion. FIG. 5 shows a graphical representation of a representative component spectrum for each of the four components.

Figures 6, 7:
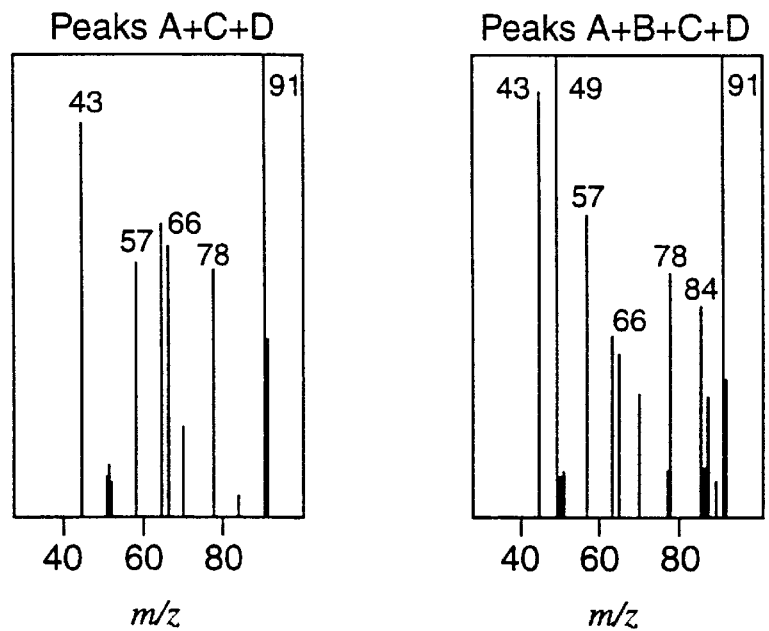
FIG. 6 graphically depicts a composite spectrum for a mixture processed in the Example, with contributions from a contaminant component removed.
FIG. 7 graphically depicts, for comparative purposes, a composite spectrum that would result from the mixture processed in the Example if the contributions of the contaminant component are not removed.

Each of the component spectrums is electronically compared with an electronically stored reference mass spectrum for dichloromethane. Any mass spectrums corresponding with component B is identified as matching with the stored reference spectrum for dichloromethane. The mass spectrums for component B are, therefore, eliminated, and component spectrums for the remaining three components, A, C and D, are summed to form a composite mass spectrum, which is shown as a graphical representation in FIG. 6. For comparison purposes, FIG. 7 shows a graphical representation of a composite spectrum that would be obtained if component spectrums for all four of components A, B, C and D were summed, without the elimination of the component spectrum for component B. A comparison between FIGS. 6 and 7 shows that the presence of the undesirable contaminant peaks of dichloromethane in FIG. 7 significantly alters the composite mass spectrum, and would significantly interfere with accurate comparison with a reference fingerprint.

It should be recognized that any feature of any embodiment disclosed herein can be combined with any other feature of any other embodiment in any combination. Also, while various embodiments of the present invention have been described in detail, it is apparent that modifications and adaptations of those embodiment will occur to those skilled in the art. It is to be expressly understood, however, that such modifications and adaptations are within the scope of the present invention.

What is claimed is:

1. A method for preparing a composite fingerprint from measured property data of a multicomponent soil gas sample, to reduce inaccuracies from the presence of one or more suspected undesirable contaminants, the method comprising the steps of:

receiving, in electronic form, test data comprising a plurality of separate data portions, each data portion corresponding to separately measured property data for a different one of a plurality of separate portions of said soil gas sample;

electronically determining whether any of said data portions is indicative of the presence in said soil gas sample of a contaminant material;

electronically eliminating from said test data any of said data portions determined, during said step of determining, to be indicative of the presence of said contaminant material in said soil gas sample;

electronically combining remaining of said data portions, not eliminated from said test data during said step of electronically eliminating, to form a composite fingerprint, said composite fingerprint being substantially free of contributions from any of said data portions eliminated during said step of electronically eliminating, whereby said composite fingerprint could be compared with an electronically stored reference fingerprint without interference from any of said data portions determined, during said step of electronically determining, to be indicative of the presence in said soil gas sample of said contaminant material.

2. The method of claim 1, wherein:

each of said data portions comprises an electronically represented component spectrum of a different one of said separate portions of said soil gas sample.

3. The method of claim 2, wherein:

each said component spectrum comprises a mass spectrum of a different one of said separate portions of said soil gas sample.

4. The method of claim 2, wherein:

each said component spectrum comprises an infrared absorption spectrum of a different one of said separate portions of said soil gas samples.

5. The method of claim 2, wherein:

each said component spectrum corresponds to a measurement of at least one property for a different one of said portions of said soil gas sample following physical separation of said soil gas sample into said separate portions.

6. The method of claim 2, wherein:

during said step of electronically determining, each said component spectrum is compared to a reference contaminant spectrum of said contaminant material.

7. The method of claim 2, wherein:

during said step of electronic determining, each said component spectrum is compared to each of a plurality of electronically stored contaminant reference spectrums, with each said contaminant reference spectrum corresponding to a different said contaminant material;

during said step of electronically eliminating, any said component spectrum identified, during said step of electronic determining, as being indicative of the presence of any said contaminant material is removed from said test data.

8. The method of claim 2, wherein:

said step of electronically determining includes electronically comparing each said component spectrum with an electronically stored contaminant reference spectrum of said contaminant material, to determine whether there is a match between any of said component spectrums and said contaminant reference spectrum indicating that the said gas sample comprises said contaminant material;

said step of electronically eliminating comprises removing from said test data any said component spectrum determined, during said step of determining, to be a match with said contaminant reference spectrum; and said step of electronically combining comprises summing together remaining of said component spectrums, not eliminated from said test data during said step of electronically eliminating.

9. The method of claim 1, wherein:

each of said data portions corresponds to measured property data for one of said separate portions of said soil gas sample, each of said separate portions of said soil gas sample comprising substantially only a single component of said soil gas sample.

10. The method of claim 1, wherein:

said contaminant material is selected from the group consisting of a terpene, a chlorinated solvent and combinations thereof.

11. The method of claim 1, wherein:

said soil gas sample comprises components collected at or near the surface of the earth as part of a geochemical survey, said components each being gaseous or vaporous when collected.

12. The method of claim 1, wherein:

following said step of electronically combining, said composite fingerprint is compared for similarity with an electronically stored reference fingerprint.

13. A method for prospecting for subterraneous occurrence of a target material, the method comprising the steps of:

excavating into the earth to a subterranean location to be tested for the presence of a preselected target material;

wherein, said subterranean location had been preselected from a geochemical survey of an area, said geochemical survey comprising:

(a) electronically evaluating similarity between survey data and reference data, said survey data comprising a plurality of data portions each corresponding to at least one property separately measured for a different one of a plurality of separate portions of a multi-component soil gas sample;

(b) said electronically evaluating including electronically determining whether any of said data portions of said survey data is representative of the presence in said sample of a contaminant component;

(c) wherein said step of electronically evaluating includes electronically removing from said survey data any of said data portions determined, during said electronically evaluating, to be representative of the presence of said contaminant component in said soil gas sample; and (d) said step of electronically evaluating including electronically comparing, after said electronically removing, remaining of said survey data with said reference data.

14. The method of claim 13, wherein:

said step of electronically evaluating includes electronically combining, prior to said electronically comparing, said remaining of said survey data, to form a composite fingerprint for comparison with said reference data.

15. The method of claim 14, wherein:

each of said data portions comprises a component spectrum, each said component spectrum corresponding to said at least one property of a different one of said separate portions of said soil gas sample; and said composite fingerprint comprises a summation of remaining of said data portions following said electronically removing.

16. The method of claim 15, wherein:

said at least one property comprises component mass measured by a mass spectrometer and each said component spectrum comprises a mass spectrum of a different one of said separate portions of said soil gas sample.

17. The method of claim 15, wherein:

each said component spectrum corresponds to separate measurement of said at least one property of a different one of said separate portions of said soil gas sample separated chromatographically from said soil gas sample.

18. An apparatus for comparing measured property data of a multicomponent soil gas sample of unknown composition with a known reference standard to reduce inaccuracies from the presence of suspected undesirable contaminants, the apparatus comprising:

electronic input means for electronically receiving individual data portions of test data, with each of said data portions corresponding to at least one measured property of a different one of a plurality of separate portions of a soil gas sample;

electronic processing means operatively electrically connected with said input means for electronically manipulating said test data said processing means including memory having stored therein reference data used during electronic manipulation of said test data;

said processing means being capable of electronically identifying whether any of said portions of said test data is representative of the presence, in said soil gas sample, of a suspected contaminant component and being capable of electronically removing, from said test data, any of said portions of said test data identified as being representative of the presence of said contaminant component in said fluid mixture;

said processing means being capable of electronically combining, to form a composite fingerprint, all data portions of said test data not electronically removed during said electronically removing and electronically comparing said composite fingerprint with said reference data;

electronic output means, operatively electrically connected with said processing means, for electronically outputting results of said electronically processing of said test data.

19. The apparatus of claim 18, wherein:

each of said data portions of said test data comprises a component spectrum corresponding to a measured property of a different one of said separate portions of said soil gas sample; and said electronically identifying comprises comparing each of said portions with a reference contaminant spectrum corresponding to said property of said contaminant component; and said processing means is capable of summing together all of said component spectrums not removed from said test data during said electronically removing, to form a composite spectrum substantially free of interference of any of said data portions identified as corresponding to said contaminant component.

20. The apparatus of claim 18, wherein:

each of said data portions of said test data comprises a mass spectrum corresponding to a different one of said separate portions of said soil gas sample.

21. The apparatus of claim 18, wherein:

each of said data portions of said test data comprises an infrared absorption spectrum corresponding to a different one of said separate portions of said soil gas sample.

22. The apparatus of claim 18, wherein:

each of said portions of said test data comprises a spectrum of a property measured separately for a different one of said separate portions of said soil gas sample physically separated from the other of said separate portions of said soil gas sample into said portions.

23. The apparatus of claim 18, wherein:

each of said data portions of said test data comprises a spectrum of a property measured separately for a different one of said separate portions of said soil gas sample following chromatographic separation from the other of said separate portions of said gas sample.

24. The apparatus of claim 18, wherein:

said memory comprises at least one of DRAM memory and RAM memory having stored therein said reference data.

* * * * *